2,889,205

METHOD OF SEPARATING NITROGEN ISOTOPES BY ION-EXCHANGE

Frank H. Spedding and Jack E. Powell, Ames, Iowa, assignors to Iowa State College Research Foundation, Inc., Ames, Iowa, a corporation of Iowa No Drawing. Application February 29, 1956
Serial No. 568,438

4 Claims. (Cl. 23—193)

This invention relates to a method of separating nitrogen isotopes by ion-exchange.

It has been known heretofore that some degree of separation between isotopes of a given element could be obtained by means of ion-exchange processes. Actually, with respect to prior art processes, "enhancement" would be a more accurate term than "separation." For example, Patent No. 2,204,072, issued June 11, 1940, describes the use of ion-exchange processes to change the ratio of isotopes of an element. Nothing approaching actual separation of isotopes is described or claimed. Typical of the results obtained is the decrease by ten percent of the rare nitrogen isotope $N^{15}$ in a solution of ammonium chloride by passing it through a column of sodium zeolite.

It is therefore a general object of this invention to provide an improved method of separating nitrogen isotopes by ion-exchange. Further specific objects are to provide a process of the character described which permits nitrogen isotopes to be produced in a highly purified form by a simple and efficient procedure. Further objects and advantages will become apparent as the specification proceeds.

The ion-exchange process of the present invention is distinguished from prior ion-exchange processes for isotope separation in that chemical constraints are employed at both the front and rear boundaries of the adsorbed band as it is displaced through the ion-exchange material. These chemical constraints serve the purpose of maintaining sharp boundaries to define a band of substantially fixed length, whereby true isotopic equilibrium can be closely approached within the band even though the isotopic exchange constants are very small. More specifically, chemical reactions should occur at the front and rear boundaries of the migrating band which have equilibrium constants of the order of $10^3$ or greater. In other words, if a boundary is to remain sharp, a chemical reaction which goes virtually to completion must take place at the boundary.

In practicing the method of this invention, an aqueous solution of ammonium hydroxide is passed through a portion of a cation exchange material in the hydrogen cycle to provide an adsorbed ammonium band having a sharply-defined front boundary. It will be understood that the ammonium hydroxide will provide both $N^{15}$ and $N^{14}$ ammonium ions. The adsorbed ammonium is then eluted and the band is displaced to successive portions of a cation exchange material in the hydrogen cycle by passing an aqueous solution of an alkali metal hydroxide through the cation exchange material behind the band. This maintains a sharply-defined rear boundary for the band. The eluting and displacing procedure is continued until the rear portion of the band contains an appreciably higher ratio of $N^{15}$ ammonia to $N^{14}$ ammonia than the front portion of the band. Preferably, it is continued until the rear portion of the band contains at least 70 mole percent of $N^{15}$ ammonia on the basis of the ammonia in the rear portion. The rear and front portions of the band can then be separated, thereby producing products containing the separated isotopes.

Any cation exchange material which can be placed in the hydrogen cycle and maintained therein can be used in practicing the method of this invention. However, strong acid cation exchange resins are preferred, especially those of the nuclear sulfonic styrene-base type. Unusually good results have been achieved with a cation exchange resin which can be described as a sulfonated styrene-divinylbenzene copolymer. Among the various commercially available cation exchange resins of the strong acid type are: Amberlite IR–120 (Rohm & Haas, Washington Square, Philadelphia 5, Pennsylvania), Dowex–50 (Dow Chemical, Midland, Michigan), Permutit Q (Permutit, 330 W. 42nd Street, New York 18, New York), Duolite C–20 (Chemical Process, Redwood City, California), Amberlite IR–100 (Rohm & Haas), Zeo-Rex (Permutit), and Duolite C–3 (Chemical Process). The last three in the foregoing list are of the phenolic methylene sulfonic-type, while the first four are of the nuclear sulfonic, polystyrene base-type. Other cationic resins include the carboxylic resins like Amberlite IRC–50 (Rohm & Haas), Duolite CS–100 (Chemical Process), and Permutit 216 (Permutit).

As indicated, the cation exchange material is used in the hydrogen cycle. It will be understood that it can be placed in the hydrogen cycle according to usual procedures. For example, after the resin is packed into the column, it can be washed with a dilute mineral acid such as 1 N $H_2SO_4$. This washing will usually be continued until the exchange material is saturated, and then it will be washed with plain water, preparatory to the introduction of the ammonium hydroxide solution.

As already indicated, the mixture of nitrogen isotopes to be separated is introduced into the ion-exchange columns in the form of an aqueous solution of ammonium hydroxide. The concentration of the ammonium hydroxide solution is not particularly critical, although it is preferred to use relatively dilute solutions. Considerable heat is liberated at the lower boundary by the reaction which occurs there, and this tends to limit the concentration of $NH_4OH$ which can be used conveniently. More specifically, it is preferred to have the normality of the ammonium hyroxide solution within the range from about 0.01 normal to 3.0 normal.

The eluting solution is preferably an aqueous solution of an alkali metal hydroxide, such as sodium or potassium hydroxide. A dilute hydroxide solution is preferred, although the concentration is not particularly critical. For example, the normality of the alkali metal hydroxide solution can range from about 0.01 normal to 3.0 normal.

When this invention is practiced using the reagents and procedure just described, the adsorbed band of ammonia will have a sharp front due to the reaction:

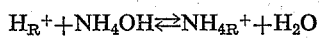

To translate the above equation into verbal terms, the hydrogen on the resin interacts with the ammonium hydroxide to provide ammonia ions on the resin and water as a reaction product. Since the equilibrium constant of this reaction is of the order of $10^9$, it can be seen that the conditions for an extremely sharp boundary are met. Similarly, the sharp rear boundary for the absorbed ammonium band is maintained by a chemical reaction, which when the eluant is sodium hydroxide, can be illustrated by the equation:

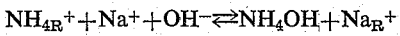

The above equation shows that the ammonium ions on the resin are exchanged for the sodium ions in the eluant, and that the free ammonium ions then react with the hydroxyl ions to form ammonium hydroxide. The equilibrium constant of this reaction is of the order of $10^5$, which again produces a sharp boundary.

Under the equilibrium conditions just described, separation of the nitrogen isotopes is greatly accelerated by the reactions occurring respectively at the front and rear boundaries of the adsorbed ammonium band. This acceleration can be explained by the fact that a molecule (ammonium hydroxide) of substantial stability is formed in the solution so that this molecular form in effect competes with the resin for the ammonium ion. Thus, in addition to the exchange reaction between the resin in the solution, which is indicated by Equation 1 below, there is an exchange reaction occurring within the solution itself, as indicated by Equation 2 below:

(1) $(N^{15}H_4^+)_S + (N^{14}H_4^+)_R \rightleftharpoons (N^{14}H_4^+)_S + (N^{15}H_4^+)_R$
(2) 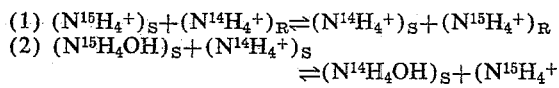
$\qquad \rightleftharpoons (N^{14}H_4OH)_S + (N^{15}H_4^+)_S$ In the above equations, the subscript S indicates solution, while the subscript R indicates the resin. While the nitrogen isotope separation process of the present invention involves other factors of importance, it is believed that the equilibrium expressed in Equation 2 is of critical importance for the success of the process.

It will be understood, of course, that in order to develop and maintain a sharp adsorbed ammonium band, it is necessary to have a uniformly packed resin bed. Under these conditions, as the solution percolates down the column, a horizontal boundary between the two solutions can be maintained. In practice, if sufficient care is taken in preparing the resin beds, tilting and channeling can be kept less than a few millimeters for columns two to six inches in diameter. Under such conditions, the adsorbed ammonium band is, accordingly, sharply confined between two boundaries and is in equilibrium throughout its length with a solution of ammonium hydroxide. The concentration of ammonium hydroxide solution in contact with the ammonium band is constant throughout and is determined by the concentration of the sodium hydroxide or other hydroxide used as the eluant. The length of the adsorbed ammonium band is primarily determined by the amount of ammonia in the column and the capacity of the resin. The band length will depend to a certain extent upon the concentration of the ammonium hydroxide in the resin pores, which is fixed by the concentration of the eluant. Once the concentration of the alkali metal hydroxide has been chosen, the length of the ammonium band remains substantially constant as it is eluted down the resin bed.

Since the length of the ammonium band remains constant as the band is eluted down the resin bed, each time an equivalent of alkali metal ion is deposited at the rear of the band it displaces an equivalent of ammonium ion. The displaced ammonium ion comes to chemical equilibrium within the system very rapidly and isotopic equilibrium tends to be approached as the solution passes over the resin. When the ammonia in solution reaches the front edge of the ammonium band, it is redeposited as ammonium ion in the resin bed. At all times, the ratio of $N^{15}$ to $N^{14}$ of the resin is greater than it is in the solution containing it. It has been found that the isotopic exchange for the system proceeds with sufficient rapidity that equilibrium is attained at the critical points in the system even when the band is moving at the rate of 30 inches per hour down a bed. The band will get richer in $N^{15}$ at the rear edge and richer in $N^{14}$ at the front edge as the elution proceeds. Between the front and rear portions of the band, there tends to be a plateau region where the ratio of the isotopes in the resin phase and solution phase are not appreciably changing, although they differ from each other. Experience has shown that it is only necessary to have a band of ammonia seven to ten feet long in order to provide a suitable plateau region and sufficient distance on either side to permit the concentration of the isotopes to approach 100% $N^{14}$ at the front and 100% $N^{15}$ at the rear. After the ammonium band is adsorbed on the bed, it is eluted for a distance of 200 to 300 feet. This allows the systems to approach a condition where continuous operation can be started. Feed solution can then be injected at the top of each column, where a plurality of columns are used, whenever the plateau region moves past the point of injection. Similarly products can be removed as the front and rear edges of the ammonium band pass the bottom of a column. In practice, since less valving is required, the feed is injected and the products withdrawn only once each time the band completes a circuit of the beds. In this procedure, a number of short columns connected in series can be used rather than a single long column. As already indicated, this arrangement permits an adsorbed band to be eluted in a cyclic manner using only a few columns, since the spent resin can be regenerated for reuse before the band comes around the next time. Other advantages of such an arrangement are simply to maintain uniform resin beds in short columns, and the resistance to flow of the eluant and regenerant solutions can be minimized by having the solutions flow only through the desired portion of the bed system in any given time. If it is desired to obtain the maximum rate of separation of isotopic species from a given feed material, one strives for the maximum mass transfer of the isotopes and adjusts the system so that an effectively continuous operation can be carried out.

Since the natural abundance of $N^{15}$ is low and the resin bed has an appreciable capacity, it is desirable to permit the $N^{15}$ to accumulate without withdrawal until its concentration has built up to the desired level. Withdrawal of $N^{14}$ can begin at the time the feed injections are started. As the ammonium band is eluted from one resin bed with sodium hydroxide eluant or other alkali metal hydroxide, the front section is allowed to proceed down the next column until the plateau region is passing between columns. At this time, a valve between the two columns is closed and a quantity of ammonium hydroxide is allowed to flow into the top of the leading column. At the same time, or at some prior or subsequent time, ammonium hydroxide containing virtually pure $N^{14}$ is allowed to flow from the bottom of the column. In practice, the withdrawal can be made slightly before or after the injection so as to occur when the front of the band is moving off a column.

There are certain other general considerations which may be mentioned as of interest to those who wish to practice the process of this invention. These considerations, however, relate mainly to the efficiency, as distinguished from the operability of the process. More specifically, for most efficient operation it is desirable that: (1) the exchange reaction employed should have as large an equilibrium constant as possible; (2) the band should be eluted as fast as practical to obtain the maximum transport per unit time, but not so fast that the band boundaries become diffused or the HETP excessively large; (3) the material should be eluted under conditions which permit maximum utilization of the active points on the resin bed by the ions being separated isotopically; and (4) the length of the adsorbed band should be selected so that sufficient plates are included within the band to give the desired products at a steady state, but not so long that excessive resistance to flow is encountered.

In one specific example, a bank of four inch by five foot columns, filled with sulfonated cation-exchange resin in the hydrogen cycle, were connected in series. Five liters of 15 N $NH_4OH$ diluted 30-fold and adsorbed on the columns, gave a band ten feet long. This band was then eluted with 0.5 N NaOH. When the ammonia band moved off a column, the sodium resin was reconverted to hydrogen resin. In this manner the ammonium band could be eluted around the bank of columns for as many band displacements as desired. After traveling fifty band lengths, most of the $N^{15}$ was concentrated in the last six inches of the band. The isotopic ratio, $N^{15}$–$N^{14}$ of the original adsorbed ammonia was 0.00365. After fifty band displacements, the ratio at the front edge of the band usually dropped to 0.00020 and in some experiments to as low as 0.00006. The first 90% of the ammonia recovered had an average isotopic ratio less than 0.00050. The isotopic ratio at the rear edge averaged better than 0.25. When the last 2% of the ammonia from such a run was adsorbed on one-inch columns and eluted, an additional 100 feet, the mole percent of $N^{15}$ at the rear edge exceeded 74%. Good results were obtained at flow rates which produced a band movement anywhere from a fraction of an inch to 30 inches per hour.

This invention is further illustrated by the following detailed experimental examples:

EXAMPLE I

A series of ten ion-exchange columns were prepared. Each column consisted of a 5-foot section of 4-inch, I.D., flanged Pyrex pipe closed at the ends by type 316 stainless steel plates bolted to standard cast iron flange sets. The end plates of the columns were center-tapped and fitted with ⅛-inch stainless steel nipples, two inches long. A circular baffle plate, two inches in diameter, supported by three ½-inch long rods of stainless steel, was welded to the bottom side of each top plate to prevent the influent solution from disturbing the resin bed. The resin bed was supported by one thickness of Saran filter cloth backed up by a 30-mesh stainless steel screen. The circles of Saran and stainless steel gauze were rubber-cemented into a 5-layer sandwich between three 6-inch, O.D., 4-inch, I.D., by ⅛-inch thick neoprene gaskets. The screen sandwich was supported an inch above the bottom plate by a Pyrex pipe spacer to prevent the screen from blocking the outlet in the bottom plate. Neoprene gaskets were used with both the column plates to obtain a water-tight seal. Individual columns of the series were interconnected by means of flexible ⁵⁄₁₆-inch Tygon tubing slipped over the ⅛-inch pipe nipples which were screwed into the end plates. By using a binding of Scotch electrical tape over the junctions and ½-inch brass tubing clamps, in addition, the system could be used up to an internal pressure of two atmospheres without leakage.

The resin beds of the columns consisted of 100–200 mesh spheres of Dowex 50–X12 and were 58–59 inches long in the H⁺ cycle and 53–54 inches long in the Na⁺ cycle. The resin beds were backwashed by removing the top plate and adding an auxiliary 5-foot section of Pyrex pipe. All exceptionally fine particles, which either did not settle readily after backwashing or which settled in a thin layer at the top of the resin beds, were removed by means of a siphon so that the finished beds offered a minimum of resistance to liquid flow. Under a 60-foot liquid head a flow rate of about a liter per minute could be obtained through a single unit.

The resin beds were given a preliminary treatment with 2 N NaOH, rinsed with distilled water and restored to the H⁺ cycle with 1 N $H_2SO_4$. The excess H⁺ ion was rinsed from the columns by means of distilled water, and five liters of 15 N $NH_4OH$, diluted 30-fold with water, was passed downflow through three of the columns connected in series. This resulted in an adsorbed $NH_4^+$ band approximately 10 feet long.

The ammonium band was eluted down the series of columns with 0.6 N NaOH at a flow rate of 120–180 ml. per minute. As the band progressed down the series, the eluant feed tube and the discharge tube were moved along so that only three columns were connected together at any one time. As the band passed, the resin left behind was reconverted from the Na⁺ to the H⁺ cycle, as before, and the columns were then ready to be reused. In all, the adsorbed band was eluted around the 10-column series ten times. Profiles were taken every twenty columns by withdrawing small samples of the solution periodically as the band passed between columns. It was found that the normal plateau is gradually removed by the transport of $N^{15}$ from the front to the rear of the band. Up to 36 displacements of the adsorbed band, the amount of $N^{15}$ transported was proportional to the distance the band was eluted. Beyond this, the plateau disappeared and the efficiency fell off markedly. As the band approaches the steady state, very little further improvement could be expected. However, the last 6 inches of the band containing practically all the $N^{15}$ was allowed to pass onto a series of 22-mm., I.D., by 4½-foot resin beds and was eluted further until a mole fraction of $N^{15}$ of 0.81 was observed at the rear edge of the band.

EXAMPLE II

Since normal ammonia contains only one part of $N^{15}$ to 273 parts of $N^{14}$, enriched ammonia from several previous runs was adsorbed onto a 2-inch diameter resin bed to form a band 45 inches long for the following experiments. The band was eluted down 60 2-inch by 5-foot columns of Dowex 50–X12, 100–200 mesh resin, at a flow rate of 125 ml. per minute with 0.6 N NaOH solution. This was more than sufficient to attain a steady state. The last 23 inches of this band, containing most of the original $N^{15}$ adsorbed on the column, was next eluted with the same NaOH solution down 30 additional columns at one-fifth the original flow rate (25 ml. per minute). Since the length of the band was less, a shorter distance of elution was required to ensure the attainment of steady state conditions.

The last 14 inches of this band were then eluted down 10 additional columns at the original flow rate of 125 ml. per minute, but with one-fifth the original concentration of NaOH, i.e., 0.12 N. Finally, the last 5½ inches of the band from the previous experiment were eluted down 3 more columns with 0.12 N NaOH at 25 ml. per minute. The data for these various runs is summarized below in Table I.

*Table I*

| Experiment | Flow Rate (ml./min.) | Column Diameter (inches) | Normality of base (equivs./l.) | Calculated Plate Height (HETP in mm.) |
|---|---|---|---|---|
| A | 125 | 2 | 0.6 | 1.55 |
| B | 25 | 2 | 0.6 | 0.66 |
| C | 125 | 2 | 0.12 | 0.44 |
| D | 25 | 2 | 0.12 | 0.17 |

EXAMPLE III

The original adsorbed band consisted of 3½ liters of 15 N ammonium hydroxide (diluted 30-fold for loading). The band was eluted down 30 columns with 0.6 N NaOH at a flow rate of 400 ml. per minute before any additional ammonia was added or any $N^{14}$-rich product was withdrawn. Thereafter, 550 ml. of 15 N ammonium hydroxide in 15 liters of solution were added each cycle and a corresponding amount of $N^{14}$ product was withdrawn. No enriched $N^{15}$ product was removed, except when profiles of the adsorbed band were taken to determine its condition. Injections were initially made nine inches ahead of the tail-end of the band, but as the $N^{15}$ concentration in the rear part of the band increased, it became necessary to gradually move the point of injection forward in order to stay on the normal plateau. The injection point was 16 inches from the tail-end of the band by the 500th column.

The depleted product being withdrawn early in the experiment had a $N^{15}$–$N^{14}$ ratio of about 0.00012, but the ratio tended to increase gradually. When the $N^{15}$-

$N^{14}$ ratio of the depleted product exceeded 0.00050, the length of the band was increased by making an addition but no withdrawal. In all, two such increases were made so that the band was about 100 inches long by column number 550 and contained the equivalent of 4.6 liters of 15 N ammonia or 69 moles.

It is apparent that these semi-continuously fed columns can be operated under conditions where 99.99% $N^{14}$ is withdrawn at the front and greater than 99% $N^{15}$ is bled slowly from the rear edge of the band.

While in the foregoing specification this invention has been described in relation to specific embodiments thereof and many details have been set forth for purpose of illustration, it will be apparent to those skilled in the art that the invention is susceptible to additional embodiments and that many of the details set forth herein can be varied considerably without departing from the basic principles of the invention.

We claim:

1. The method of separating nitrogen isotopes by ion-exchange, characterized by the steps of passing an aqueous solution of ammonium hydroxide through a portion of a strong acid cation exchange resin in the hydrogen cycle to provide an adsorbed ammonium band having a sharply-defined front boundary, said resin being substantially uniformly packed in an elongated column, said ammonium hydroxide providing both $N^{15}$ and $N^{14}$ ammonium ions, then eluting the adsorbed ammonia while displacing said band to successive portions of a cation exchange material in the hydrogen cycle by passing an aqueous solution of an alkali metal hydroxide through the cation exchange material behind said band, thereby maintaining a sharply-defined rear boundary for said band, and continuing said eluting and displacing until the rear portion of said band contains an appreciably higher ratio of $N^{15}$ ammonia to $N^{14}$ ammonia than the front portion of said band, said ammonium hydroxide solution having a normality ranging from 0.01 normal to 3.0 normal and said alkali metal hydroxide solution having a normality ranging from 0.01 normal to 3.0 normal.

2. The method of claim 1 in which said cation exchange material is a sulfonated styrene-divinylbenzene copolymer, and in which said alkali metal hydroxide is sodium hydroxide.

3. The method of claim 1 in which said eluting and displacing are continued until the rear portion of said band contains at least 70 mole percent $N^{15}$ ammonia on the basis of the total ammonia.

4. The method of claim 1 in which said alkali metal hydroxide is sodium hydroxide.

References Cited in the file of this patent

UNITED STATES PATENTS 2,204,072    Dean _____ June 11, 1940

OTHER REFERENCES

Kunin and Myers book, "Ion Exchange Resins," pp. 26–31, John Wiley and Sons, Inc., N.Y.

Burrell: Article in Ind. and Eng. Chem., vol. 30, No. 3, March 1938, pages 358–360.